United States Patent [19]

Nastrom

[11] Patent Number: 4,955,000
[45] Date of Patent: Sep. 4, 1990

[54] ULTRASONIC PERSONNEL LOCATION IDENTIFICATION SYSTEM

[75] Inventor: Harvey J. Nastrom, Shoreview, Minn.

[73] Assignee: NAC Engineering and Marketing, Inc., Shoreview, Minn.

[21] Appl. No.: 368,054

[22] Filed: Jun. 16, 1989

Related U.S. Application Data

[63] Continuation of Ser. No. 887,071, Jul. 17, 1986, abandoned.

[51] Int. Cl.⁵ .............................................. G01S 15/88
[52] U.S. Cl. .................................. 367/117; 367/900; 367/901; 367/910
[58] Field of Search ............... 367/117, 910, 901, 900, 367/134, 135

[56] References Cited

U.S. PATENT DOCUMENTS

| | | | |
|---|---|---|---|
| 3,362,010 | 1/1968 | Rabinow | 367/117 |
| 3,439,320 | 4/1969 | Ward | 367/117 |
| 3,696,384 | 10/1972 | Lester | 340/312 |
| 3,723,957 | 3/1973 | Damon | 367/117 |
| 3,902,478 | 9/1975 | Konopasek et al. | 128/2.06 F |
| 3,946,159 | 3/1976 | Fay | 179/2 TV |
| 4,092,599 | 5/1978 | Yee et al. | 325/55 |
| 4,103,286 | 7/1978 | Nicolini et al. | 340/146.2 |
| 4,110,743 | 8/1978 | Zahnd | 340/311 |
| 4,176,337 | 11/1979 | Aechter | 367/135 X |
| 4,225,953 | 9/1980 | Simon et al. | 367/117 |
| 4,253,166 | 2/1981 | Johnson | 367/117 |
| 4,364,043 | 12/1982 | Cole et al. | 340/825.54 |
| 4,510,495 | 4/1985 | Sigrimis et al. | 340/825.54 |

OTHER PUBLICATIONS

"Intro to Communication Systems", Addison-Wesley Publishing Company Ferrel Stremmler, Dec. 1982 pp. 383–403.

Primary Examiner—Thomas H. Tarcza
Assistant Examiner—Tod Swann
Attorney, Agent, or Firm—Kinney & Lange

[57] ABSTRACT

An ultrasonic system for identifying the location of personnel within a multiple room complex. The system includes ultrasonic transmitters adapted to be transported by the personnel. The transmitters periodically transmit pulse code modulated (PCM) transmitter signals representative of a digital code sequence characteristic of the person, and formed by a plurality of bit positions which are separated from adjacent bit positions by predetermined time intervals. Ultrasonic receivers for receiving the transmitter signals are positioned within each room of the complex. The receivers detect bits of the code sequence only during window periods corresponding to expected bit positions. Detected code sequences are compared to predetermined code sequences, and receiver signals are produced as a function of the comparison. A central station is coupled to receive the receiver signals, and provides a visual indication of the rooms in which the persons transporting the transmitters are located.

15 Claims, 8 Drawing Sheets

ULTRASONIC PERSONNEL LOCATION IDENTIFICATION SYSTEM

This is a continuation of application Ser. No. 06/887,071, filed July 17, 1986 (now abandoned).

BACKGROUND OF THE INVENTION

1. Field of the Invention.

The present invention is an electronic system for identifying the location of personnel within a multiple room complex. In particular, the present invention is an ultrasonic personnel location identification system utilizing pulse code modulated transmissions.

2. Description of the Prior Art.

In large multiple room complexes it is often desirable to identify the location of various persons within the complex. In a hospital ward, for example, it is often important for a head nurse or other attendant at a central station to know in which rooms various types of personnel such as other nurses or aides are located.

Personnel location systems of the type discussed above are well known and widely used in hospitals. One such system includes switches in each room which are actuated by a nurse and/or aide when they enter the room. The switches are interfaced to the central nursing station which provides an indication of personnel location. The problem with systems of this type is that personnel often forget to actuate the switches when they enter or leave the room. As a result, the information provided by the central station is often inaccurate and therefore unreliable.

Radio frequency (RF) and infrared (IR) personnel location systems are also in use. Systems of these types include RF or IR receivers in each room of the ward. Each receiver is interfaced to the central station. Portable transmitters worn by the personnel periodically transmit RF or IR signals characteristic of the persons. When they enter a room, the RF or IR signals are detected by the receivers. The receivers, in turn, provide location information to the central station.

Signals produced by the RF transmitters of these systems have a tendency to be detected by receivers in adjacent rooms. IR transmitters have the opposite problem. The signals transmitted by IR transmitters are very directional, and depending upon the person's orientation, may not be detected by the receiver within the room. In any event, use of either system can result in unreliable indications at the central station.

It is evident that there is a continuing need for improved personnel location identification systems. For convenience and accuracy, the system must operate without any actions on the part of the personnel whose locations are desired to be known. The system must also be able to recognize personnel irrespective of their position or orientation within the room, and be insensitive to personnel in adjacent rooms. Simply put, the system must provide highly accurate information which personnel at the central station can rely upon at critical times.

SUMMARY OF THE INVENTION

The present invention is an ultrasonic system for identifying the location of personnel within a multiple room complex. The system includes at least one ultrasonic transmitter which is adapted to be transported by a person, and which transmits an ultrasonic transmitter signal characteristic of the person. A plurality of ultrasonic receivers are adapted to be positioned in each room of the complex. The receivers receive the transmitter signals, and provide receiver signals representative thereof. A central station is coupled to the receivers to receive the receiver signals, and provides an indication of the room in which the person transporting the receiver is located.

In preferred embodiments, the transmitters periodically transmit pulse code modulated (PCM) ultrasonic transmitter signals representative of a digital code sequence characteristic of the person transporting the transmitter. The PCM transmitter signals are formed by a predetermined number of bit positions which are spaced from adjacent bit positions by predetermined time intervals.

The ultrasonic receivers are adapted to receive the PCM transmitter signals, and detect bits of the code sequence only during window periods corresponding in time to expected bit positions. The detected digital code sequence is compared to predetermined code sequences. Receiver signals are produced as a function of the comparison and provided to the central station.

The ultrasonic personnel location identification system of the present invention overcomes problems associated with those of the prior art. The ultrasonic signals can be transmitted at sufficient power levels to produce reflections off the walls of the rooms and assure their receipt by the receivers irrespective of the transmitter orientation, yet will not activate receivers in adjacent rooms. Since the bits of the PCM signal are spaced from adjacent bits, reflections from a previous bit are adequately damped before another code bit is transmitted. By detecting bits of the received transmitter signal only during window periods corresponding to expected bit positions, the likelihood of interference from reflections or other transmitters is greatly reduced. The system is therefore highly accurate and reliable.

DETAILED DESCRIPTION OF THE PREFERRED EMBODIMENTS

Figure 1:
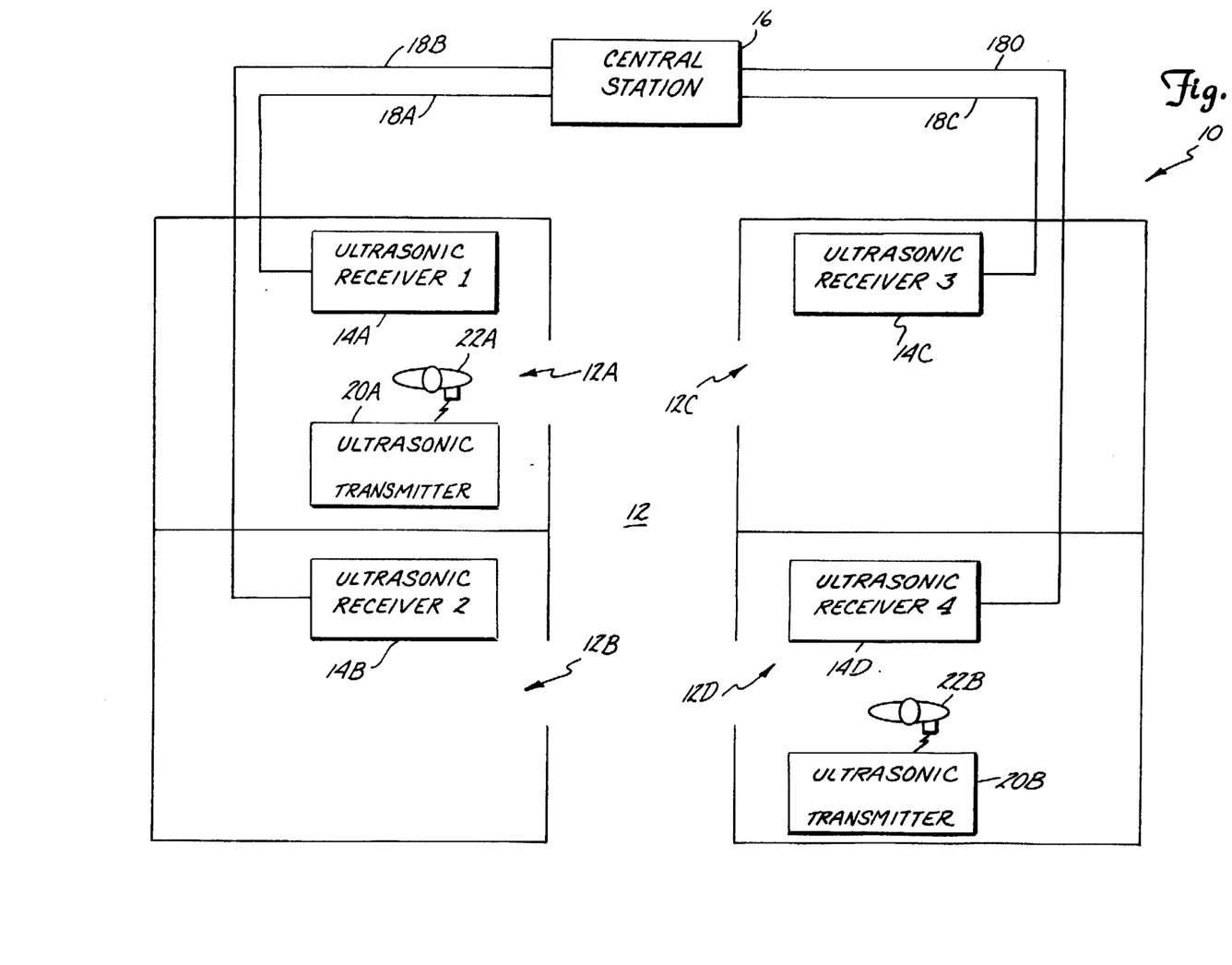
FIG. 1 is a block diagram representation of the ultrasonic personnel location identification system of the present invention.

Ultrasonic personnel location identification system 10 of the present invention is illustrated generally in FIG. 1. Personnel location system 10 is adapted for use in a multiple room complex, such as hospital ward 12, which includes a plurality of rooms 12A–12D. Ultrasonic receivers 14A–14D are positioned within rooms 12A–12D, respectively. Receivers 14A–14D are each interfaced to a central station, such as a central nursing station 16, via transmission lines 18A–18D, respectively.

Ultrasonic personnel location system 10 also includes one or more ultrasonic transmitters 20A-20B which are portable and adapted to be transported by persons such as nurse 22A and aide 22B, respectively, who occupy or otherwise move about ward 12. Transmitters 20A-20B are preferably small, unobtrusive devices which can be clipped to an article of clothing.

In operation, personnel location identification system 10 is used to identify the location of persons such as nurse 22A and aide 22B within ward 12. Transmitters 20A-20B generate and transmit an ultrasonic transmitter signal characteristic of the person carrying the transmitter. In a preferred embodiment, transmitters 20A-20B transmit a pulse code modulated (PCM) ultrasonic signal which is characteristic of the personnel type, or job function, of persons 22A-22B. Transmitter 20A will transmit a PCM signal representative of nurse 22A, for example, while transmitter 20B will transmit a PCM signal characteristic of aide 22B. Transmitters 20A-20B can also generate transmitter signals with unique codes representative of the identity of nurse 22A and aide 22B.

Whenever nurse 22A or aide 22B enters one of rooms 12A-12D, the receivers 14A-14D located therein will receive the transmitter signal transmitted by transmitters 20A-20B, and produce a receiver signal representative thereof which is provided to central station 16. In response, central station 16 will provide an indication of the rooms in which the personnel are located, as well as an indication of the person's job function, identity, or other characteristic. In one embodiment to be described, station 16 provides a visual indication of this information. Using the example shown in FIG. 1, station 16 will provide an indication that aide 22B is within room 12D, and that nurse 22A is within room 12A.

Figure 2:
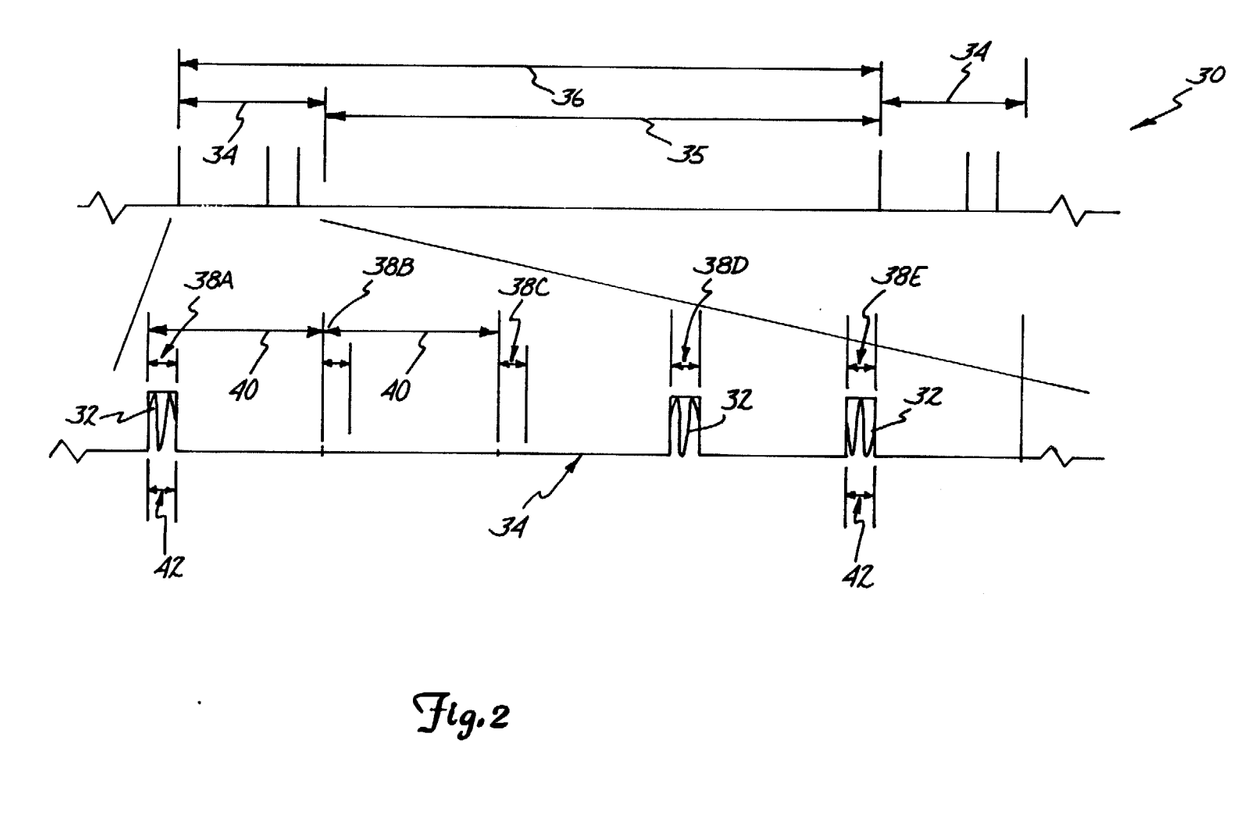
FIG. 2 is a diagrammatic illustration of an ultrasonic transmitter signal transmitted by the ultrasonic transmitters shown in FIG. 1 with portions thereof shown in detail.

Pulse code modulated transmitter signal 30, which is representative of that generated and transmitted by transmitters 20A-20B, is illustrated generally in FIG. 2. Transmitter signal 30 is formed by an ultrasonic carrier signal 32 which is periodically on-off keyed to produce a plurality of pulse code modulated (PCM) portions 34 which are separated by predetermined intervals 35. A period of signal 30 is indicated at 36. In one embodiment which is described below, carrier signal 32 is a 40.96 KHz ultrasonic signal. PCM portions 34 are approximately 488.5 msec. in length. To assure interference free transmissions, it is desirable that transmitters 20A-20B generate transmitter signals 30 having different periods 36. In one embodiment, transmitter 20A produces a transmitter signal 30 having a period of 2.5 seconds, while transmitter signal 30 of transmitter 20B has a period of 2.0 seconds.

As shown in FIG. 2, PCM portions 34 are formed by a plurality of bit positions 38A-38E, each of which is representative of a digital value. Bit positions 38A-38E are separated from one another by periods 40. In one preferred embodiment, bits 38A-38E are 4.9 msec. in length and spaced from one another by periods 40 of 97.7 msec. Bit positions such as 38A, 38D and 38E which are representative of a digital "1" are produced by switching ultrasonic carrier signal 32 "on". Bit positions such as 38B and 38C which are representative of a digital "0" are produced when carrier signal 32 is switched or remains "off."

In the embodiment of the present invention described below, the "10011" code sequence of PCM portion 34 shown in FIG. 2 is transmitted by transmitter 20A, and is characteristic of a nurse. Transmitter 20B can, for example, produce a transmitter signal with PCM portions 34 representative of a "11001" code sequence characteristic of an aide. First bit position 38A of all PCM portions 34 preferably have a digital "1" value which is used by receivers 14A-14D as a start or parity bit for timing purposes. Bit positions 38B-38E therefore characterize the persons transporting receivers 20A-20B.

Figure 3:
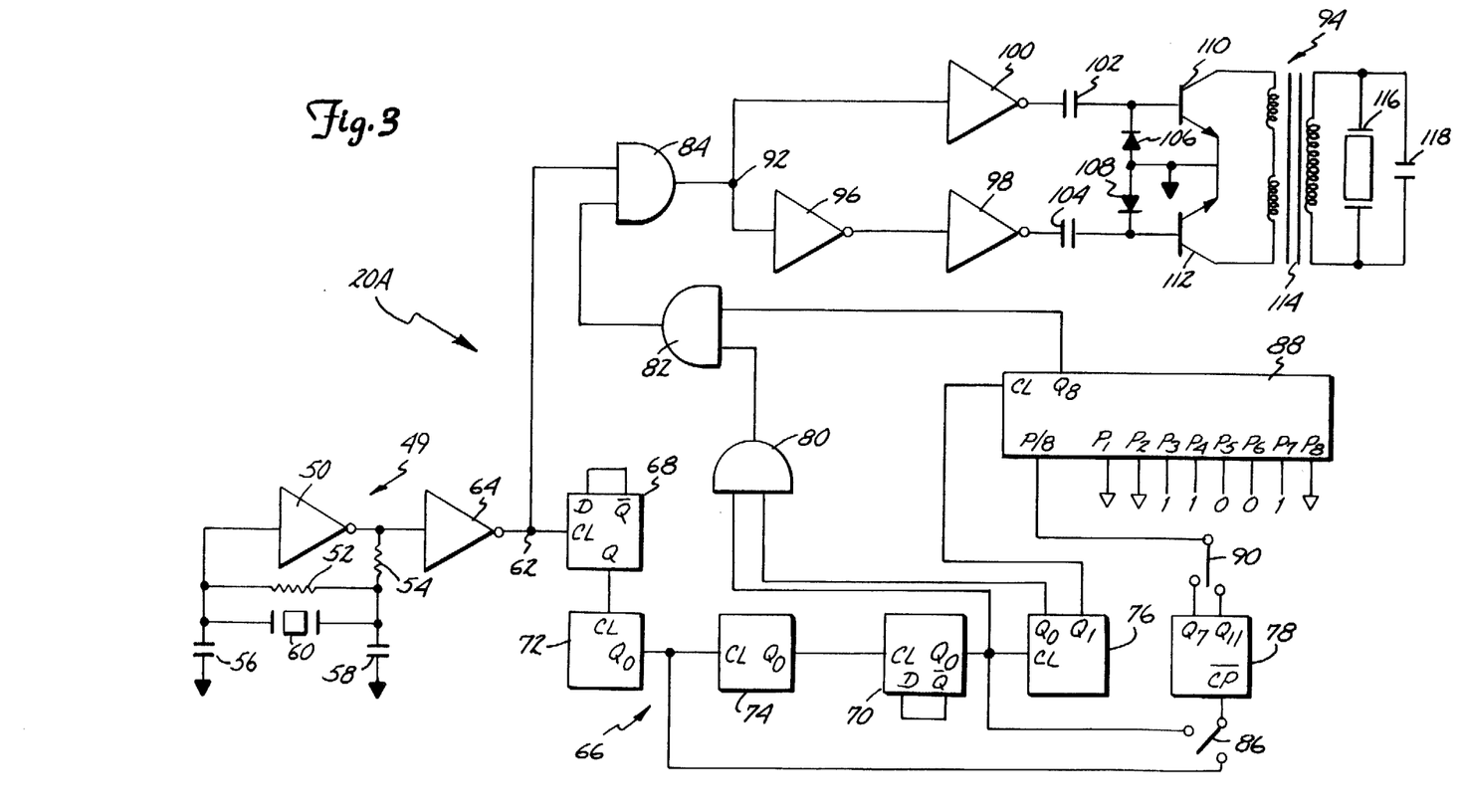
FIG. 3 is a schematic diagram of a preferred circuit implementation of the ultrasonic transmitters shown in FIG. 1.

A schematic diagram of one embodiment of transmitter 20A, which is representative of transmitters 20A-20B, is illustrated in FIG. 3. A Pierce-type oscillator circuit 49 is formed by inverters 50 and 64, resistors 52 and 54, capacitors 56 and 58, and tuning fork crystal 60. Crystal 60 operates at a 40.96 KHz frequency in this embodiment, causing oscillator circuit 49 to produce a 40.96 KHz signal at node 62.

The 40.96 KHz signal produced by oscillator 49 is applied to and processed by timing circuitry 66. Timing circuitry 66 includes flip-flops 68 and 70, Johnson counters 72, 74, and 76, binary counter 78, and AND gates 80,82, and 84. Flip-flop 68 is connected to divide the frequency of the signal received from oscillator 49 in half, and produces a 20.48 KHz signal which is applied to the clock (CL) input terminal of Johnson counter 72.

Johnson counters 72 and 74 operate as frequency dividers and divide the frequency of the signal applied thereto by ten. Signals having frequencies of 2.048 KHz and 204.8 Hz are provided at the $Q_0$ output terminals of Johnson counters 72 and 74, respectively. Flip-flop 70 is connected to divide the frequency of the signal received from Johnson counter 72 by two, producing a 102.4 Hz signal at its $Q_0$ output terminal. The frequency of this signal is divided by ten by Johnson counter 76, which produces 10.24 Hz signals at its $Q_0$ and $Q_1$ output terminals. Johnson counters 72, 74 and 76 operate in such a manner as to produce an asymetrical output signal having a digital "1" value for one-tenth of their period. The digital signals outputted terminals $Q_0$ and $Q_1$ of counter 76 are therefore high for 9.77 msec of their 97.7 msec period.

Counter 78 is a 14-stage binary counter having its clock (CP) terminal connected to receive either the 102.4 Hz signal from the $Q_0$ output of flip-flop 70, or the 2.048 KHz signal from the $Q_0$ output of Johnson counter 72, through switch 86. When switch 86 is actuated to select the 2.048 KHz signal, the frequency of this signal is divided by 4096 by counter 78, with a 0.5 Hz output signal being produced at its $Q_{11}$ output. When switch 86 is actuated to select the 102.4 Hz signal, the frequency of this signal is divided by 256 by counter 78 resulting in a 0.4 Hz signal at its $Q_7$ output terminal.

Transmitter 20A also includes parallel load, serial-out shift register 88. Input terminals $P_7$-$P_3$ are hard wired to receive supply potentials representative of the digital code sequence to be transmitted. Other input terminals such as $P_1$, $P_2$ and $P_8$ are connected to ground. In the embodiment shown, shift register 88 is connected to receive signals representative of a "10011" code sequence. The P/8 input terminal is connected to receive either the 0.4 Hz or 0.5 Hz signal from the $Q_7$ or $Q_{11}$ outputs, respectively, of counter 78 through switch 90. Shift register 88 is clocked by the 10.24 Hz signal received at its CL terminal from Johnson counter 76.

When the signal received from counter 78 switches high, shift register 88 performs a parallel load of bits $P_3$-$P_7$. When this signal switches low, the loaded bits are serially shifted from the $Q_8$ output terminal of shift register 88 to an input terminal of AND gate 82 at the 10.24 Hz clock frequency.

The 10.24 Hz signal from $Q_0$ output of Johnson counter 76, the 102.4 Hz signal from flip-flop 70, the code bit sequence shifted out of shift register 88, and the 40.96 KHz signal from oscillator 49 are ANDed together by the combination of AND gates 80, 82, and 84 to produce a 40.96 KHz transmitter signal 30 which is pulse code modulated in accordance with the code sequence applied to shift register 88. The circuit shown in FIG. 3 will produce a transmitter signal 30 at node 92 which is similar to that shown in FIG. 2. Spacing between bits of the signal is 97.7 msec. Digital "1" values are represented by a 4.88 msec burst of the 40.96 KHz signal. Bit positions such as 38A, 38D and 38E which are representative of digital "1" values will therefore include approximately 122 cycles of the 40.96 KHz signal. This signal will have a period of 2.0 or 2.5 seconds depending upon the setting of switches 86 and 90.

The pulse code modulated signal from node 92 is applied to an output stage 94 through inverters 96, 98, and 100, and capacitors 102 and 104. Output stage 94 is formed by diodes 106 and 108, transistors 110 and 112, transformer 114, ultrasonic transducer 116, and capacitor 118. An ultrasonic transmitter signal 30 such as that illustrated in FIG. 2 will be transmitted by output stage 94.

Figure 4A:
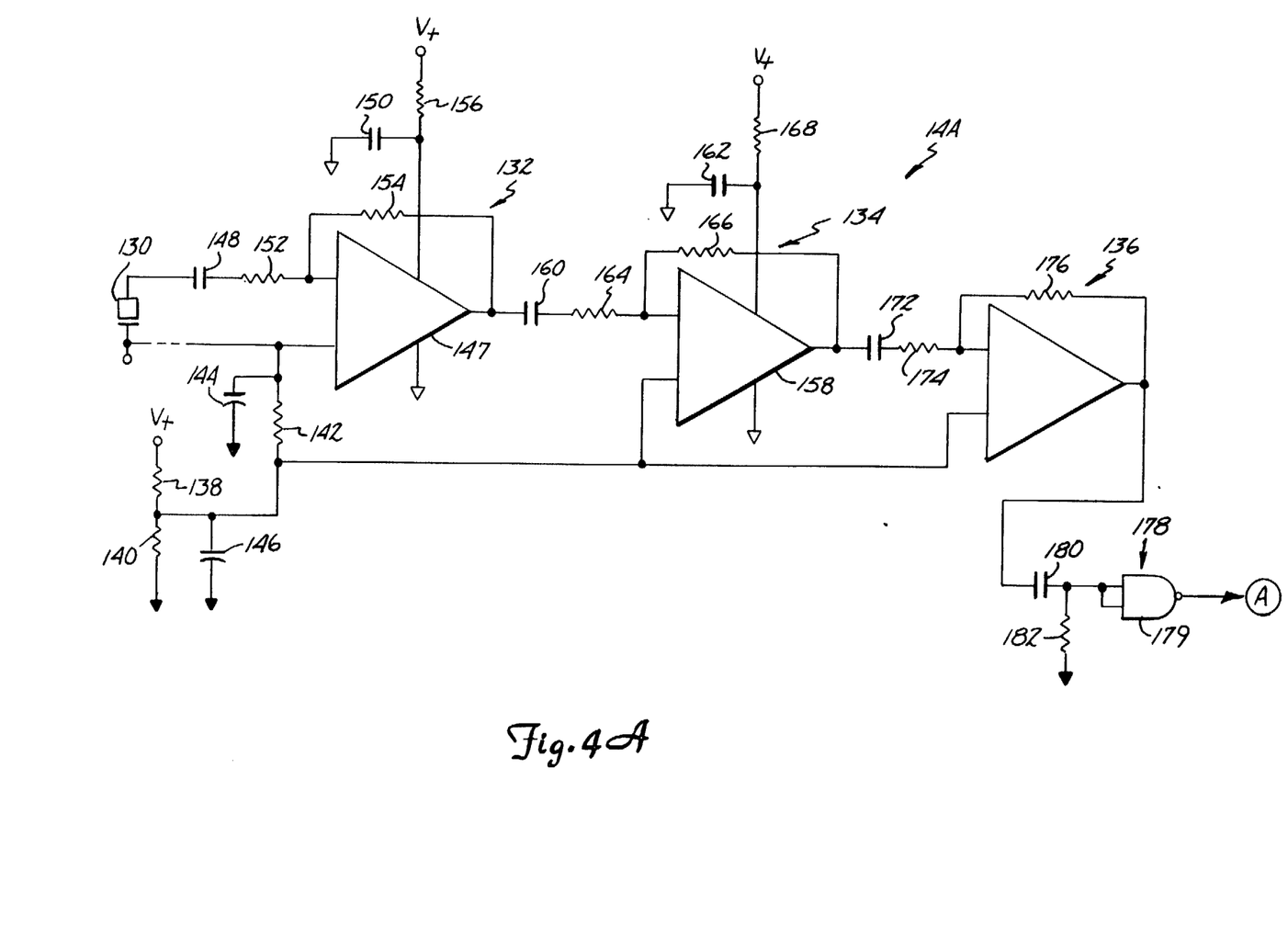
FIGS. 4A–4C are schematic diagrams of a preferred circuit implementation of the ultrasonic receivers shown in FIG. 1.
Figure 4B:
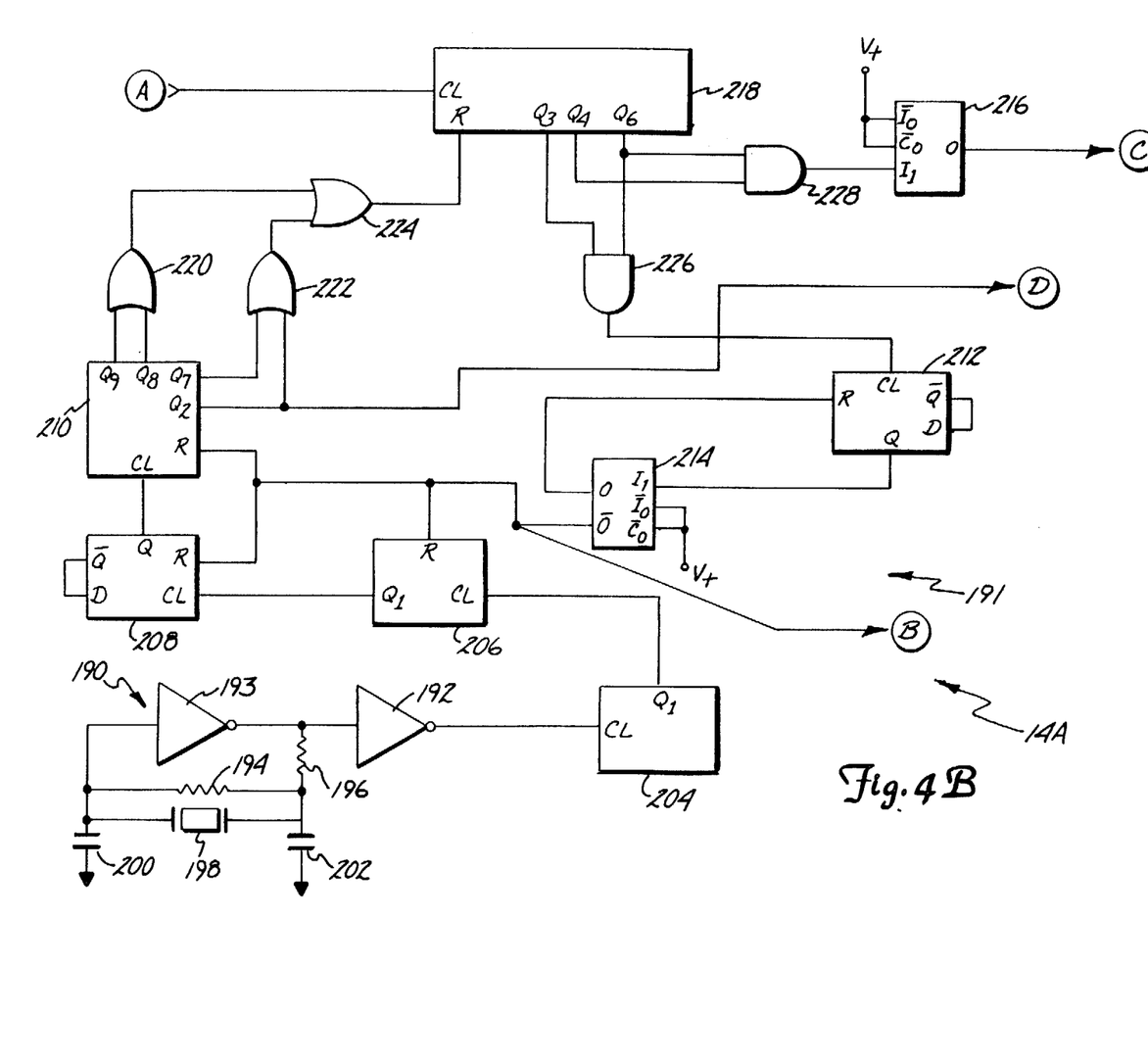
Figure 4C:
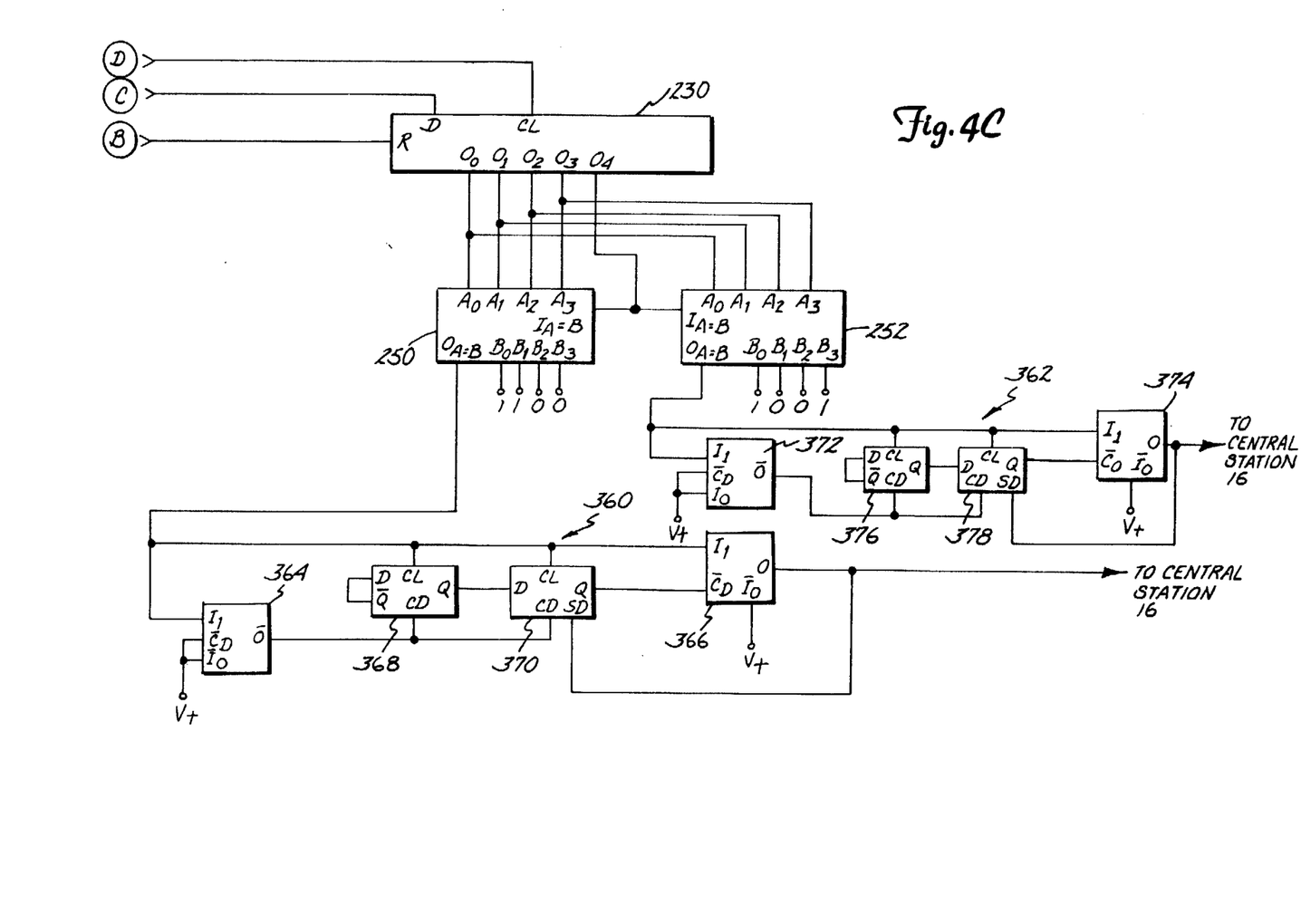

A preferred circuit implementation of ultrasonic receiver 14A, which is representative of receivers 14A–14D, is schematically illustrated in FIGS. 4A–4C. Referring first to FIG. 4A, pulse code modulated ultrasonic transmitter signals 30 (FIG. 2) are received by ultrasonic transducer 130 and amplified by three amplifier stages 132, 134, and 136. A biasing network for amplifier stages 132–136 is formed by resistors 138, 140, and 142, and capacitors 144 and 146. First amplifier stage 132 includes operational amplifier 147, capacitors 148 and 150, and resistors 152, 154, and 156. Amplifier stage 134 is formed by operational amplifier 158, capacitors 160 and 162, and resistors 164, 166, and 168. Amplifier stage 136 is formed by operational amplifier 170, capacitor 172, and resistors 174 and 176. In one embodiment, the combined gain of amplifier stages 132, 134, and 136 is 16,000. The power supply and reference decoupling provided by capacitors 146, 144, 150, and 162, and resistors 142, 156, and 164 assure stability at this high gain.

The signal outputted amplifier stage 136 is supplied to Schmidt trigger circuit 178 which is formed by NAND gate 179, capacitor 180, and resistor 182. Schmidt trigger circuit 178 processes the signal received from amplifier stage 136 in a known manner to assure that this signal is in the form of a square wave.

Demodulator/detector 191 is described with reference to FIGS. 4B and 4C. Demodulator/detector 191 includes Pierce-type oscillator 190 which is formed by inverter 193, resistors 194 and 196, tuning fork crystal 198, and capacitors 200 and 202. Oscillator 190 produces a 20.48 KHz signal which is buffered by inverter 192.

The 20.48 KHz signal from buffer 192 is applied to the clock (CL) terminal of Johnson counter 204 which divides the frequency of the signal by ten, and provides a 2.048 KHz signal at its $Q_1$ terminal. The 2.048 KHz signal is then applied to the clock (CL) terminal of Johnson counter 206 which again divides the frequency of this signal by ten, and produces a 204.8 Hz signal at its $Q_1$ output terminal. The 204.8 Hz signal produced by Johnson counter 206 is applied to the clock (CL) terminal flip-flop 208. Flip-flop 208 is configured to divide the frequency of this signal by two, and provides a 102.4 Hz signal at its Q output terminal.

The 102.4 Hz signal from flip-flop 208 is applied to the clock (CL) input terminal of Johnson counter 210. Although only the $Q_2$, $Q_7$, $Q_8$, $Q_9$ terminals of Johnson Counter 210 are shown, it is a 5-stage device with output terminals $Q_0$–$Q_9$. Upon successive cycles of the 102.4 Hz clock signal, the signals provided at terminals $Q_0$–$Q_9$ sequentially switch to a digital "1" value, while all others remain at a digital "0" value.

Demodulator/detector 191 also includes flip-flop 212, one-shots or monostable multivibrators 214 and 216, binary counter 218, OR gates 220, 222, and 224, AND gates 226 and 228, and shift register 230 (FIG. 4C). OR gate 220 has input terminals connected to receive the signals present at the $Q_9$ and $Q_8$ output terminals of Johnson counter 210, while OR gate 222 has its input terminals connected to receive the signals present at the $Q_2$ and $Q_7$ output terminals of Johnson counter 210. Outputs of OR gates 220 and 222 are applied as inputs to OR gate 224. An output of OR gate 224 is applied to the reset (R) terminal of counter 218. Counter 218 is therefore reset whenever one of the $Q_2$, $Q_7$, $Q_8$, or $Q_9$ outputs of Johnson counter 210 goes high.

Counter 218 has a clock (CL) terminal which is connected to receive the amplified 40.96 KHz signal from Schmidt trigger circuit 178. AND gate 226 has input terminals connected to receive the signals present at the $Q_3$ and $Q_6$ output terminals of counter 218. The signals present at the $Q_4$ and $Q_6$ output terminals of counter 218 are applied to the input terminals of AND gate 228.

Flip-flop 212 has a clock (CL) terminal connected to receive the output signal from AND gate 226. Flip-flop 212 is configured in such a manner that the signal present at its Q output terminal, which is applied to the trigger ($I_1$) terminal of monostable multivibrator 214, changes states upon successive cycles of the signal received at its clock terminal.

Monostable multivibrator 214 has an output (O) terminal coupled to the reset (R) terminal of flip-flop 212. A complementary output ($\bar{O}$) terminal is coupled to the reset (R) terminal of flip-flop 208, Johnson counters 206 and 210 and shift register 230. Monostable multivibrator 214 is configured to have a time constant long enough to permit demodulator/detector 191 to demodulate PCM portion 34 (FIG. 2) of the received transmitter signal 30, and to detect the code sequence therein. To demodulate an ultrasonic transmitter signal 30 such as that described above, monostable multivibrator 214 is configured to have a time constant of approximately 500 msec.

Multivibrator 216 has a trigger ($I_1$) terminal connected to receive the signal present at the output of AND gate 228. An output (O) terminal of multivibrator 216 is coupled to the data (D) terminal of shift register 230. Multivibrator 216 functions as a pulse stretcher, and is configured to have a time constant of approximately 22 msec. for use with transmitter signal 30 described above.

Shift register 230 has a clock (CL) terminal connected to receive the 10.24 Hz signal at the $Q_2$ output terminal of Johnson counter 210. Data which is serially shifted into shift register 230 is presented in a parallel format at its output terminals $O_0$–$O_4$.

Figure 5:
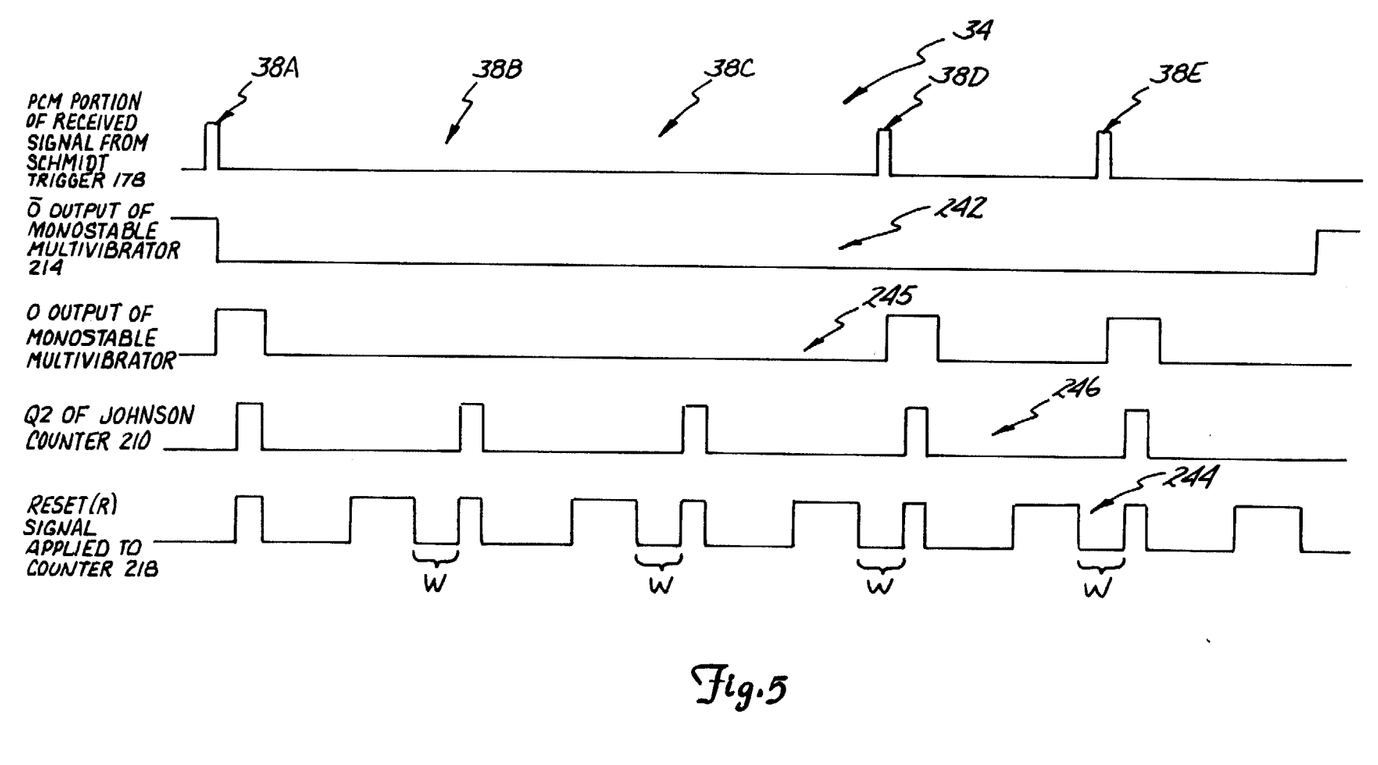
FIG. 5 is a timing diagram of portions of the circuit illustrated in FIGS. 4A–4C.

Operation of demodulator/detector 191 can be described with reference to FIGS. 4B and 4C, and the timing diagram shown in FIG. 5. After being received by receiver 14A, PCM portion 34 of transmitter signal 30 is amplified by amplifier sections 132, 134, and 136 and processed by Schmidt trigger 178 before being applied to the clock (CL) terminal of counter 218. Following the example used above, PCM portion 34 illustrated in FIG. 5 has bit positions 38A-38E which are representative of a received "10011" code sequence characteristic of a nurse.

As previously discussed, a first bit position 38A of PCM portion 34 has a digital "1" value and is used by receiver 14A has a start bit. After counter 218 receives 72 cycles of the 40.96 KHz carrier signal 32 forming the first digital "1" of bit position 38A, AND gate 226 clocks flip-flop 212 which in turn triggers monostable multivibrator 214. The signal at the $\overline{O}$ output of monostable multivibrator 214, illustrated at 242 in FIG. 5, then switches low, resetting counters 206 and 210, flip-flop 208, and shift register 230. The $\overline{O}$ output of monostable multivibrator 214 will remain low for approximately 500 msec., which is the time needed to demodulate the expected 5-bit code within PCM portion 34.

Counter 218 counts cycles of the 40.96 KHz carrier signal 32 representative of bit positions 38A-38E having a digital "1" value only when reset signal 244 applied to its reset (R) terminal is low. Reset signal 244 produced by OR gates 220, 222, and 224 is illustrated in FIG. 5. As shown, reset signal 244 includes window periods W during which the signal is low. Reset signal 244 is high on both sides of window periods W. Window periods W are timed with respect to first bit position 38A to occur when digital values of bit positions 38B-38E are expected. Receiver 14A is therefore insensitive to stray ultrasonic signals which could otherwise be mistaken for a digital "1" code bit.

When 80 cycles of 40.96 KHz carrier signal 32 are counted by counter 18 during window periods W, (i.e., when a bit position representative of a digital "1" is received), AND gate 228 triggers multivibrator 214, driving the signal at its O output terminal high. A signal 245 at the O output terminal of multivibrator 216 is illustrated in FIG. 5. Monostable multivibrator 216 acts as a pulse stretcher, and provides 22 msec. pulses representative of bit positions 38A-38E having a digital "1" value to the data (D) terminal of shift register 230.

A clock signal 246 provided at the $Q_2$ output terminal of Johnson counter 210 will be high for a period of 9.8 msec. immediately following each window period W of signal 244. Clock signal 246 is applied to the clock (CL) terminal of shift register 230. As a result, a digital code sequence representative of the digital state of signal 245 during window periods W, and therefore representative of the code sequence of PCM portion 34 of transmitter signal 30, is clocked into shift register 230. The $O_0$, $O_1$, $O_2$, $O_3$, and $O_4$ output terminals of shift register 230 will therefore have digital states representative of the 5-bit code of PCM portion 34 of the received transmitter signal 30.

Receiver 14A also includes comparators 250 and 252 for comparing the detected code sequence present at the $O_0$-$O_3$ output terminals of shift register 230 to predetermined codes. Terminals $B_0$-$B_3$ of comparator 250 are connected to receive supply potentials representative of a "0011" code sequence, the last four bits of the code sequence transmitted by transmitter 20A, and characteristic of a nurse. Comparator 252 has its input terminals $B_0$-$B_3$ hard wired to receive supply potentials representative of the last four bits of another expected code sequence. In the embodiment shown, terminals $B_0$-$B_3$ are connected to receive supply potentials representative of a 1001 code sequence which is transmitted by transmitter 20B and characteristic of an aide.

When shift register 230 is clocked for a fifth time after being reset, the digital "1" of start bit postion 38A will be clocked into the $O_4$ output. The $I_{A=B}$ input terminals of comparators 250 and 252 will go high at this time, causing comparators 250 and 252 to compare the code sequence hard wired to their $B_0$-$B_3$ input terminals to the code sequence present at the $O_0$-$O_3$ output terminals of shift register 230. Upon a favorable comparison at either comparator 250 or 252, a signal at its $O_{A=B}$ output terminal will go high and produce a pulse indicating the receipt of a transmitter signal having the particular code sequence.

Receiver 14A also includes counter/timer circuits 360 and 362 which are connected to receive signals from comparators 250 and 252, respectively. Circuits 360 and 362 produce receiver signals only when a predetermined number of transmitter signals characterizing particular personnel such as an aide or a nurse are received within a predetermined time. The receiver signals produced by detectors 360 and 362 are continously provided to central station 16 (FIG. 1) through driver circuits (not shown) as long as presence of the personnel continues to be detected.

Counter/timer circuit 360 is formed by monostable multivibrators 364, and 366, and flip-flops 368 and 370. Counter/timer circuit 362 includes monostable multivibrators 372 and 374, and flip-flops 376 and 378. Operation of counter/timer circuit 360, which is also representative of the operation of circuit 362, is as follows.

Pulses produced at the $O_{A=B}$ terminal of comparator 250 are provided to the trigger ($I_1$) input terminals of monostable multivibrators 364 and 366, and to the clock (CL) input terminals of flip-flops 368 and 370. Upon receipt of a first pulse from comparator 250, the clear direct (CD) terminals of flip-flops 368 and 370 will be clocked by a signal from the O terminal of multivibrator 364, clearing flip-flops 368, 370 and multivibrator 366. Upon receipt of three more successive pulses, each within the time constant period of multivibrator 364 of the previous pulse, the signal at the O output terminal of multivibrator 366 will go high, providing a receiver signal indicating the detection of a transmitter signal 30 characteristic of a nurse. In other words, four successive PCM portions 34 having a code sequence characteristic of a nurse, and each within six seconds of the previous one, have to be recognized by comparator 250 before counter/timer circuit 360 produces a receiver signal. The receiver signal will then be continuously provided by circuit 360 until six seconds elapse without the receipt of a pulse from comparator 250.

Figure 6:
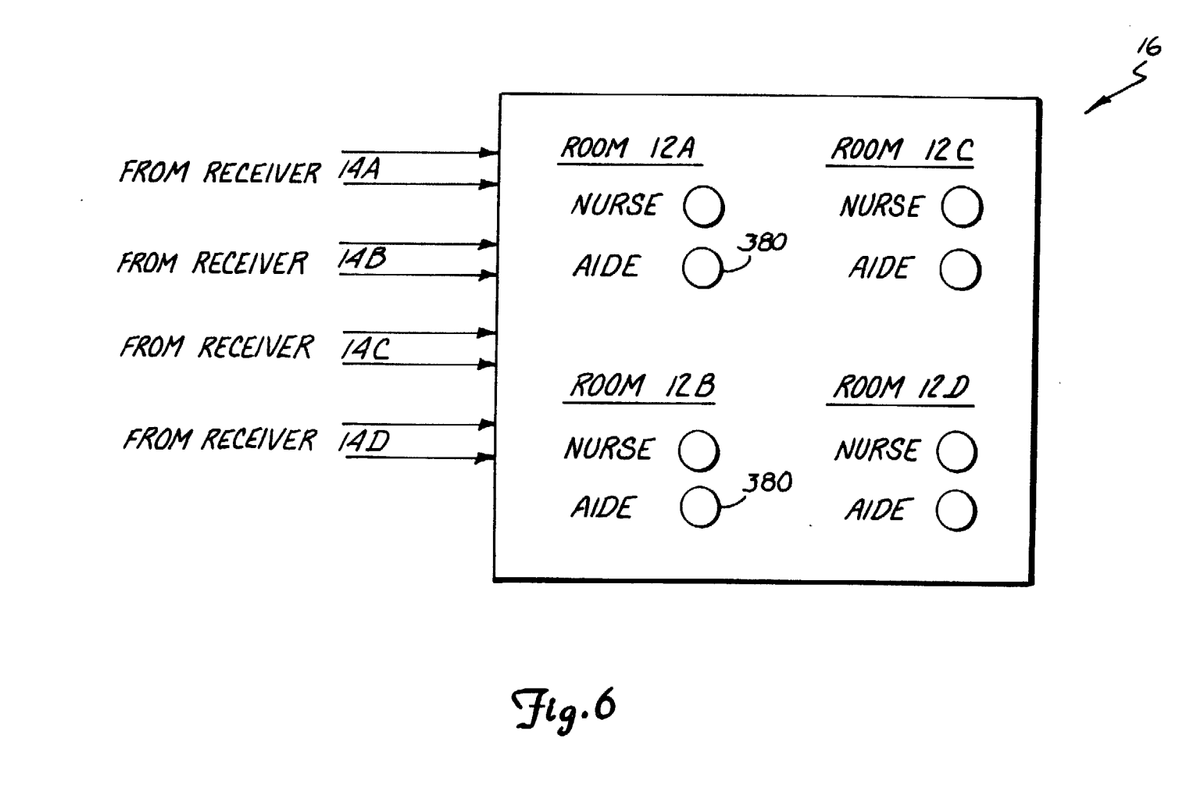
FIG. 6 is a diagram illustrating an embodiment of the central station shown in FIG. 1.

One embodiment of central station 16 is illustrated in FIG. 6. Central station 16 is connected to receive receiver signals from receivers 14A-14D. In the embodiment shown, central station 16 is connected to receive receiver signals representative of both aides and nurses, such as those produced by receiver 14A and described above, over separate transmission lines. For each room 12A-12D within hospital ward 12, central station 16 includes a room reference indicia (e.g., the words "Room 12A"), and devices for providing an indication of the presence of both a nurse and an aide, such as LED's 380, which provide visual indications of the presence of these personnel. In response to a receiver signal representative of either a nurse or an aide from one of receivers 14A-14D, an LED 380 indicative thereof will be illuminated. In the example shown in FIG. 6, central station 16 indicates the presence of a nurse within room 12A, and an aide within room 12D, as is shown in FIG. 1.

Personnel location system 10 described above offers a number of advantages over the prior art. Ultrasonic signals such as those produced by the transmitters are not of sufficient power to penetrate walls separating rooms within the complex. As a result, the transmitters will not activate the receivers in adjacent rooms, producing erroneous indications at the central station. The directionality problem often associated with infrared systems is also overcome by the present invention. Since the detectors of receivers 14A-14D are timed to "listen" for bits of the transmitter signal code sequence only during time periods during which they are expected (i.e., during window periods W), the power output of the transmitter signal can be relatively high. At these high power levels, the transmitter signals will reflect off the walls of the rooms with enough intensity to permit detection by the receivers regardless of the orientation of the transmitters. These reflections will not interfere with the proper detection of the bits since they are masked from the receivers during all times but the window periods. The spacing between bits of each PCM portion also permits the reflections to be damped. Interference free transmissions are further assured by the different periods of transmitter signals transmitted by transmitters used by different types of personnel.

Although the present invention has been described with reference to preferred embodiments, those skilled in the art will recognize that changes may be made in form or detail without departing from the spirit or scope of the invention.

What is claimed is:

1. An ultrasonic system for identifying the location of personnel within a multiple room complex including:
    at least one ultrasonic transmitter adapted to be transported by a person, for periodically transmitting ultrasonic transmitter signals formed by pulse code modulated (PCM) portions representative of a digital code sequence characteristic of a person and separated from one another by transmitter signal periods, the PCM portions formed by a predetermined number of bit positions representative of a digital value and separated from one another by predetermined bit spacing periods;
    a plurality of ultrasonic receivers, each adapted to be positioned in a room of the complex, for receiving the transmitter signals and providing receiver signals as a function thereof, each ultrasonic receiver including a timer for timing detector window periods separated from one another by window spacing periods corresponding to the bit spacing periods of the PCM portions of the transmitter signals, and a detector for determining the code sequence of the received transmitter signal by detecting digital values only during the timed window periods; and
    a central station coupled to the receivers to receive the receiver signals, for providing an indication of the room in which the person transporting the receiver is located.

2. The ultrasonic personnel location identification system of claim 1 wherein each ultrasonic transmitter periodically transmits its PCM transmitter signals at predetermined transmitter signal periods.

3. The ultrasonic personnel location identification system of claim 2 and including a plurality of ultrasonic transmitters, and wherein at least some of the ultrasonic transmitters transmit their PCM transmitter signals at different transmitter signal periods.

4. The ultrasonic personnel location identification system of claim 1 and including a plurality of ultrasonic transmitters, and wherein at least some of the ultrasonic transmitters transmit PCM transmitter signals characteristic of the person's job function.

5. The ultrasonic personnel location identification system of claim 4 wherein the ultrasonic transmitters periodically transmit their PCM transmitter signals at predetermined transmitter signal periods, and wherein PCM transmitter signals characteristic of different job functions are transmitted at different transmitter signal periods.

6. The ultrasonic personnel location identification system of claim 1 wherein the ultrasonic receivers include a comparator responsive to the detector for comparing the detected code sequence to at least one predetermined code sequence, and for providing a receiver signal as a function of the comparison.

7. The ultrasonic personnel location identification system of claim 1 wherein the ultrasonic receivers include counter/timer means for providing the receiver signals only if a predetermined number of PCM transmitter signals representative of an identical code sequence are received during a predetermined time period.

8. The ultrasonic system of claim 1 wherein:
    the ultrasonic transmitters include circuitry for causing the PCM portions to begin with a start bit; and
    the ultrasonic receivers include circuitry for detecting the start bit and for causing the timer to initiate the timing of the window periods upon the detection of the start bit.

9. The ultrasonic system of claim 8 wherein the ultrasonic transmitters include circuitry for causing the PCM portions to begin with a logic "1" start bit.

10. The ultrasonic personnel location identification system of claim 1 wherein the transmitter signal periods are relatively long with respect to the PCM portions.

11. The ultrasonic personnel location identification system of claim 10 wherein the bit spacing periods are relatively long with respect to the bit positions.

12. An ultrasonic receiver suitable for use in an ultrasonic personnel location identification system wherein the receiver is one of a plurality of such receivers, each of which is configured to be positioned within a room of a multiple room complex, adapted to receiver periodic ultrasonic transmitter signals transmitted by transmitters carried by a person and formed by pulse code modulated (PCM) portions representative of a digital code sequence characteristic of a person and separated from one another by transmitter signal periods, the PCM portions formed by a predetermined number of bit positions representative of a digital value and separated from one another by predetermined bit spacing periods, and configured to be interfaced to a central station which provides an indication of the room in which the person transporting the transmitter is located; the ultrasonic receiver including a timer for timing detector window periods separated from one another by window spacing periods corresponding to the bit spacing periods of the PCM portions of the transmitter signals, and a detector for determining the code sequence of the received transmitter signal by detecting digital values only during the timed window periods.

13. The ultrasonic receiver of claim 12 wherein:
   the receiver is configured for use with transmitters which cause the PCM portions of the transmitter signals to begin with start bits; and
   the ultrasonic receiver includes circuitry for detecting the start bit and for causing the timer to initiate the timing of the detector window periods upon the detection of the start bits.

14. The ultrasonic receiver of claim 13 and further including circuitry for initiating the timing of the window periods upon the detection of logic "1" start bits.

15. An ultrasonic transmitter suitable for use in an ultrasonic personnel location identification system wherein the transmitter is one of a plurality of such transmitters, each of which is adapted to be transported by a person and transmits ultrasonic transmitter signals characteristic of the person, and is configured to operated with a plurality of ultrasonic receivers positioned within rooms of a multiple room complex for receiving the transmitter signals and providing receiver signals as a function thereof to a central station which provides an indication of the room in which the person transporting the receiver is located, which ultrasonic transmitter periodically transmits ultrasonic transmitter signals formed by pulse code modulated (PCM) portions representative of a digital code sequence characteristic of a person and separated from one another by transmitter signal periods, the PCM portions formed by a predetermined number of bit positions representative of a digital value and separated from one another by predetermined bitspacing periods, the transmitter used in conjunction with ultrasonic receivers of the type which include a timer for timing detector window periods separated from one another by window spacing periods corresponding to the bit spacing periods of the PCM portions of the transmitter signals, and a detector for detecting digital values only during the timed window periods.

* * * * *